(12) United States Patent
Chason et al.

(10) Patent No.: US 9,580,334 B2
(45) Date of Patent: *Feb. 28, 2017

(54) LIQUID PURIFICATION SYSTEM

(71) Applicant: DMR INTERNATIONAL, INC., Woodstock, IL (US)

(72) Inventors: Marc Kenneth Chason, Woodstock, IL (US); Rick Latella, Woodstock, IL (US); Daniel R. Gamota, Woodstock, IL (US)

(73) Assignee: DMR INTERNATIONAL, INC., Woodstock, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,221

(22) Filed: Apr. 29, 2014

(65) Prior Publication Data

US 2015/0307364 A1 Oct. 29, 2015

Related U.S. Application Data

(63) Continuation-in-part of application No. 13/887,338, filed on May 5, 2013.

(51) Int. Cl.
*C02F 1/00* (2006.01)
*C02F 1/50* (2006.01)

(52) U.S. Cl.
CPC . *C02F 1/00* (2013.01); *C02F 1/50* (2013.01); *B01D 2239/0442* (2013.01); *C02F 1/505* (2013.01); *C02F 2201/002* (2013.01); *C02F 2209/02* (2013.01); *C02F 2209/05* (2013.01); *C02F 2209/06* (2013.01); *C02F 2209/36* (2013.01); *C02F 2303/04* (2013.01); *C02F 2307/00* (2013.01)

(58) Field of Classification Search
CPC .......... C02F 1/00; C02F 1/5281; B01D 39/20
USPC .................................................. 210/85, 251
See application file for complete search history.

(56) References Cited

U.S. PATENT DOCUMENTS 3,133,016 A * 5/1964 Hardison et al. ............. 210/763
6,083,382 A * 7/2000 Bird ............................ 210/96.2
(Continued)

OTHER PUBLICATIONS

PubChem Chemistry Database, Stearate, Create Date Sep. 16, 2004; Modify Date Apr. 9, 2016.*

*Primary Examiner* — Robert Clemente
*Assistant Examiner* — Akash Varma
(74) *Attorney, Agent, or Firm* — Justin Lampel

(57) ABSTRACT

A liquid purification system is provided. Although not limited to water, the purification system is especially suitable for water. The purification system utilizes a vessel having antimicrobial inner wall load bearing surfaces and/or antimicrobial (antibacterial, anti-fungal, anti-mold, etc.) interior non-load bearing surfaces. When the liquid moves within the vessel and contacts the antimicrobial surfaces, the liquid becomes purified or sanitized. The inner wall load bearing surfaces and non-load bearing interior surfaces of the vessel may be manufactured from a host polymer that has antimicrobial organo-metallic additives which form a solid-solution with the host polymer and are distributed homogeneously throughout the host polymer. The host polymer matrix may be an organic material, an inorganic material or an organic-inorganic material blend. The antimicrobial agent polymer matrix may be located in localized zones within the vessel.

17 Claims, 12 Drawing Sheets

(56) References Cited

U.S. PATENT DOCUMENTS

| | | | | |
|---|---|---|---|---|
| 6,162,363 | A * | 12/2000 | Fayed | B09C 1/02 |
| | | | | 210/688 |
| 6,391,815 | B1 * | 5/2002 | Weston et al. | 502/79 |
| 2006/0032807 | A1 * | 2/2006 | Sansalone | B01D 15/00 |
| | | | | 210/263 |
| 2007/0065519 | A1 * | 3/2007 | Hishida | A01N 59/20 |
| | | | | 424/630 |
| 2008/0035551 | A1 * | 2/2008 | Kuo | 210/321.72 |
| 2008/0160057 | A1 * | 7/2008 | Fellows | 424/409 |
| 2009/0127208 | A1 * | 5/2009 | Berkowitz et al. | 210/749 |

\* cited by examiner

FIGURE 1

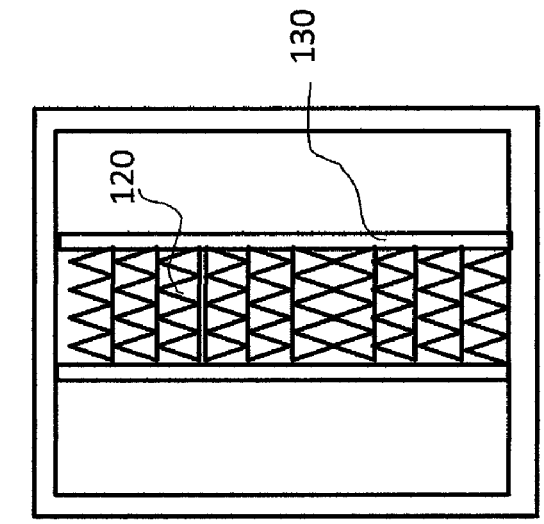
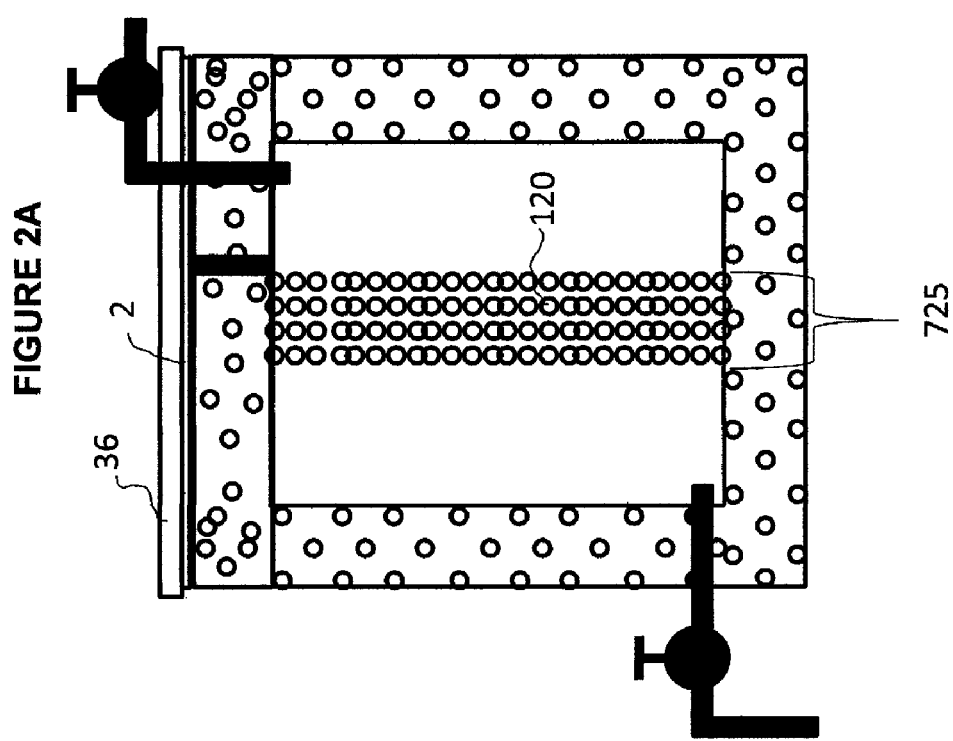

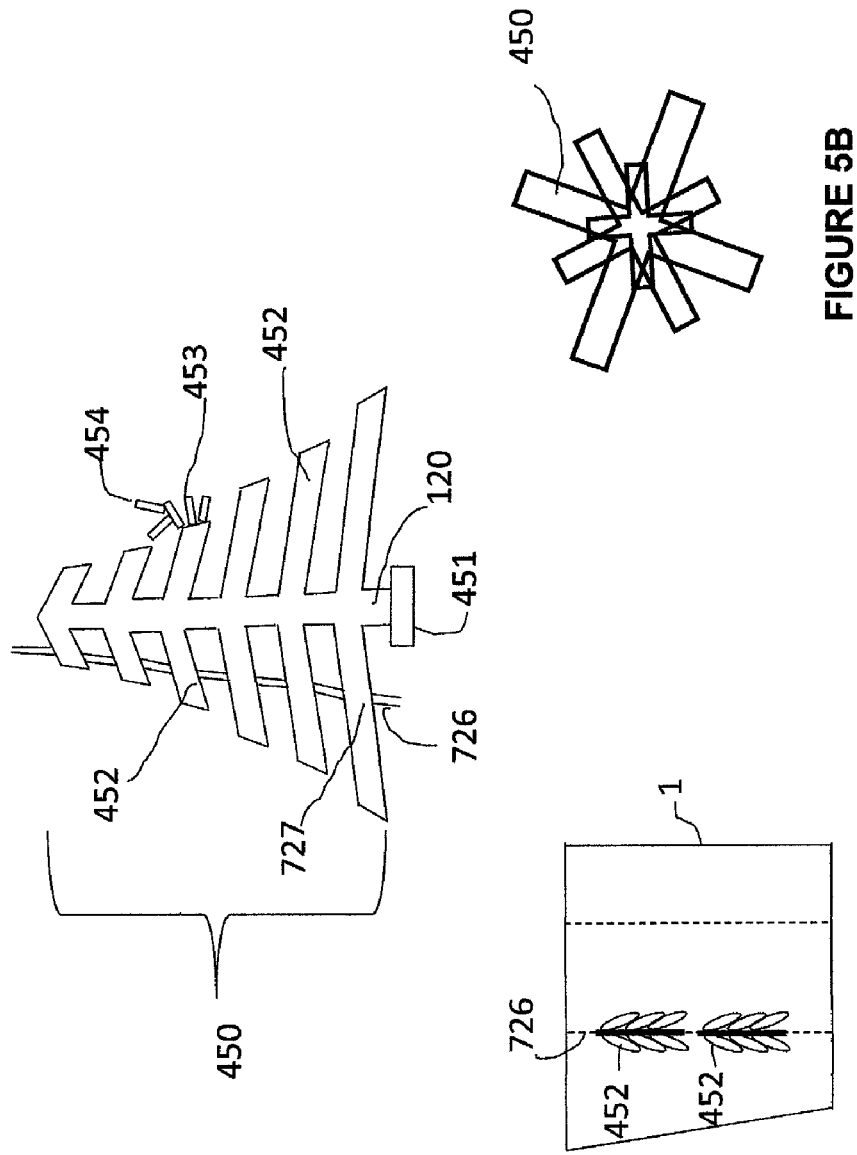

LIQUID PURIFICATION SYSTEM

CROSS REFERENCE TO RELATED APPLICATIONS

The present application is a Continuation-In-Part application based on U.S. non-provisional patent application Ser. No. 13/887,338 filed May 5, 2013, currently co-pending, the entire contents of which are incorporated by reference. Applicant claims the priority benefit of the Ser. No. 13/887,338 application.

BACKGROUND OF THE INVENTION

A liquid purification system is provided. Although not limited to water, the purification system is especially suitable for water. The purification system utilizes a vessel having antimicrobial inner wall load bearing surfaces and/or antimicrobial (antibacterial, anti-fungal, anti-mold, etc.) interior non-load bearing surfaces. When the liquid moves within the vessel and contacts the antimicrobial surfaces, the liquid becomes purified, disinfected or sanitized. The inner wall load bearing surfaces and non-load bearing interior surfaces of the vessel may be manufactured from a host polymer that has antimicrobial organo-metallic additives which form a solid-solution with the host polymer and are distributed homogeneously throughout the host polymer. The host polymer matrix may be an organic material, an inorganic material or an organic-inorganic material blend. The antimicrobial agent polymer matrix may be located in localized zones within the vessel.

It is well known to provide vessels for storing or transporting liquids. For example, stationary water-based liquids vessel structures such as cisterns, rain barrels and portable vessels such as bottles and multi-gallon jugs are often used to transport and/or store liquids. During use, these vessels have the potential to become contaminated with disease causing agents. As a result, antimicrobial containing vessels have been created, some having purification, disinfecting and/or sanitization pathways, which help the purification, disinfecting and/or sanitization of liquid for portable use (such as drinking bottles, etc.), private homes, businesses, and public facilities.

Examples of existing art appear in numerous products. In-home activated carbon based filter systems use carbon to filter particulate matter from the liquid, but do not offer sanitation, relying on the antimicrobial functioning of chlorine additives. Reverse osmosis devices require high pressure to force water flow through membranes. None of these methods are useful in producing sanitized water in water storage tanks. Chlorine and similar additives can offer sanitation functionality, but they require maintaining appropriate chemical levels in the liquid.

Present water-based liquid purification systems generally rely on activated carbon filters, chlorine and similar additives, reverse osmosis devices, etc. Although these methods have demonstrated some utility, they typically suffer from several limitations of which the following are the most often cited: 1) limited life expectancy of the vessel; 2) high initial system costs; 3) the vessels generally do not confer significant antimicrobial resistance; 4) narrow range of effectiveness against anti-microbial agents; 5) toxic to viruses and molds with potential toxicity to humans at the levels employed; 6) minimal portability for systems providing high efficacy performance; 7) costly system preventive maintenance; 8) costly system consumables; and 9) potential for compromised system performance.

An improved water-based liquid vessel which has increased antimicrobial agent activity and overcomes these limitations would play a valuable role in producing a healthier environment, creating a smaller carbon footprint, and enhancing sustainability. Accordingly, the present water-based liquid vessel is provided.

SUMMARY OF THE INVENTION

A liquid purification system is provided. Although not limited to water, the purification system is especially suitable for water. The purification system utilizes a vessel having antimicrobial inner wall load bearing surfaces and/or antimicrobial (antibacterial, anti-fungal, anti-mold, etc.) interior non-load bearing surfaces. When the liquid moves within the vessel and contacts the antimicrobial surfaces, the liquid becomes purified, disinfected or sanitized. The inner wall load bearing surfaces and non-load bearing interior surfaces of the vessel may be manufactured from a host polymer that has antimicrobial organo-metallic additives which form a solid-solution with the host polymer and are distributed homogeneously throughout the host polymer. The host polymer matrix may be an organic material, an inorganic material or an organic-inorganic material blend. Furthermore, the host material may be, for example, paper, cement, concrete, ceramic or a combination thereof. For example, the paper host may be manufactured similarly to pleated cellulose paper cartridge filters (for example, Omni-Filter Pleated Paper Filters™) which contain an organo-metallic additive. Similarly, the cement, concrete and/or ceramic materials may contain the organo-metallic additives. It should be understood that other materials may be used as well. The antimicrobial agent polymer matrix may be located in localized zones within the vessel. As a result, the present device increases the surface area of the antimicrobial agent and polymer matrix beyond that exhibited solely by the vessel walls.

The terms vessel, container, basin, tank, cistern, bottle, jug and/or reservoir are used interchangeably throughout this document and are used to describe a structure which is used to contain a liquid or a purification pathway for flowing liquids such as but not limited to a cartridge, tube or pipe. Further the cartridge, tube or pipe may have a region referred to as a zone. Zones define localization of the antimicrobial purification components such as but not limited to particulates, pellets, membranes, rings, fibers, threads, sheets, and ribbons. The purification components in the zone may be positioned between at least one plate that serves to keep the components localized in the vessel. The plate may permit liquid transfer and passage via openings, pores, and holes. The present vessel may contain more than one zone with each zone having similar components or different components. In an embodiment, the present device may further have sensors which monitor, for example, pH of the liquid. The terms sanitization, disinfecting and purification are used interchangeably to describe the function of reducing the level of microbial material in the liquid.

In an embodiment, the present system may have liquid purification components, sensing devices, communications links, and energy systems. The vessel and liquid purification components may be fabricated using single-metal or multi-metal blends of organo-metallic polymers dispersed throughout a host polymer matrix to provide an increased antimicrobial surface area for sanitizing the liquid. The vessel and (water-based) liquid purification components may be fabricated so as to provide multiple final product form factors which yield optimal sanitization of the liquid e.g., antimicrobial functionality. The organo-metallic polymers may be hydrocarbon based chemical moieties chemically bonded to metals such as silver (Ag), copper (Cu), and zinc (Zn). The chemical structures of these elements may provide for enhanced miscibility throughout the host polymer matrix with low solubility in the liquid and limited leaching into the liquid. For the purposes of this system, the term "sparingly soluble in water" as stated below refers to a substance having a solubility of 0.1 g per 100 ml of water to 1 g per 100 ml of water. Unless specified otherwise, the term "sparingly soluble" and "sparingly soluble in water" are used interchangeably in the description of the invention below to refer to substances that are sparingly soluble in water.

Still another advantage of the present device is to provide a water-based purification system which has a vent hole for allowing a user to control the pressure within the vessel.

And another advantage of the present device is to provide a water-based liquid purification system which has an optional cover located on the top of the vessel.

Yet another advantage of the present water-based liquid purification system is that the present system may have specialized zones which each help purify the water in different aspects.

And yet another advantage of the present device is to provide a water-based liquid purification system which may be used on juices or other liquids.

Still another advantage of the present device is to provide a water-based liquid purification system which sanitizes and/or purifies and stores the liquid and maintains the purity level of stored water-based liquid at a desired level with respect to relative mandated governmental thresholds.

Yet another advantage of the present device is to provide a water-based purification system which is comprised of electrical, mechanical, and optical sub-systems which work in unison to purify a liquid.

And another advantage of the present water-based liquid purification system is that the present system may have liquid purification components, sensing devices, communications links, and energy systems.

Yet another advantage of the present water-based liquid purification system is to provide a device which uses energy from the electrical power grid or from harvesting of solar, wind, thermal, or vibrational energy. The energy system may also incorporate an energy storage device such as, for example, a battery, capacitor or battery connected to a capacitor.

For a more complete understanding of the above listed features and advantages of the present water-based liquid purification system, reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 1 illustrates a front cross-sectional view of an embodiment of the vessel of the present application.

FIG. 2a illustrates a front cross-sectional view of an embodiment of the vessel wherein the vessel has a cover.

FIG. 2b illustrates a plate located within the interior of the vessel.

FIG. 5a illustrates a cross-sectional view of an embodiment of the non-load bearing liquid purification component wherein the non-load bearing liquid purification component is a base having branches (the "tree" configuration).

FIG. 5b illustrates a top view of an embodiment of the non-load bearing liquid purification component wherein the non-load bearing liquid purification component is a base having branches (the "tree" configuration).

FIG. 5c illustrates an embodiment wherein a portion of a tree-shaped non-load bearing liquid purification component extends through an opening in a wall of a predetermined zone of the vessel.

DETAILED DESCRIPTION OF THE PREFERRED EMBODIMENTS

Figure 3:
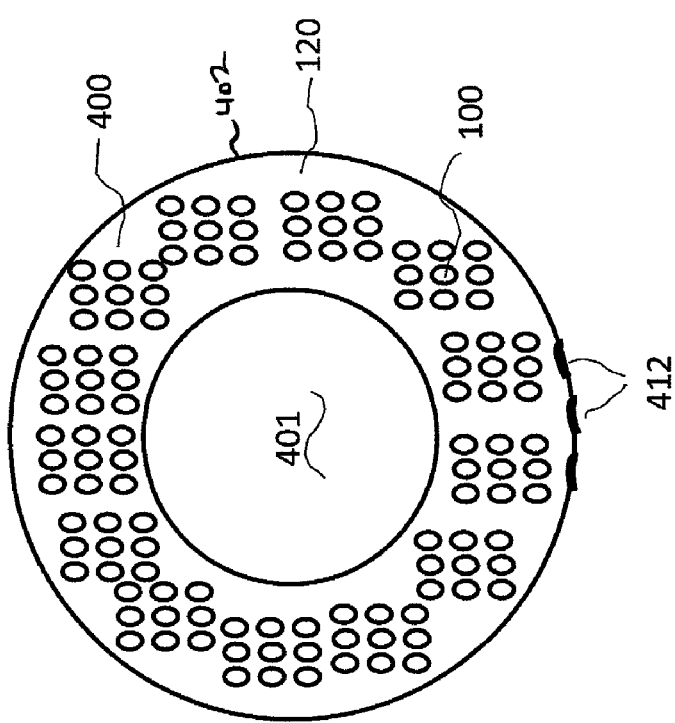
FIG. 3 illustrates a cross-sectional view of an embodiment of the non-load bearing liquid purification component wherein the non-load bearing liquid purification component is in the form of a sphere.

A liquid purification system is provided. Although not limited to water, the purification system is especially suitable for water. The purification system utilizes a vessel having antimicrobial inner load bearing wall surfaces and/or antimicrobial (antibacterial, anti-fungal, anti-mold, etc.) interior non-load bearing surfaces. When the liquid moves within the vessel and contacts the antimicrobial surfaces, the liquid becomes purified or sanitized. The inner wall load bearing surfaces and non-load bearing interior surfaces of the vessel may be manufactured from a host polymer that has antimicrobial organo-metallic additives which form a solid-solution with the host polymer and are distributed homogeneously throughout the host polymer. The host polymer matrix may be an organic material, an inorganic material or an organic-inorganic material blend. The antimicrobial agent polymer matrix may be located in localized zones within the vessel.

Figure 1:
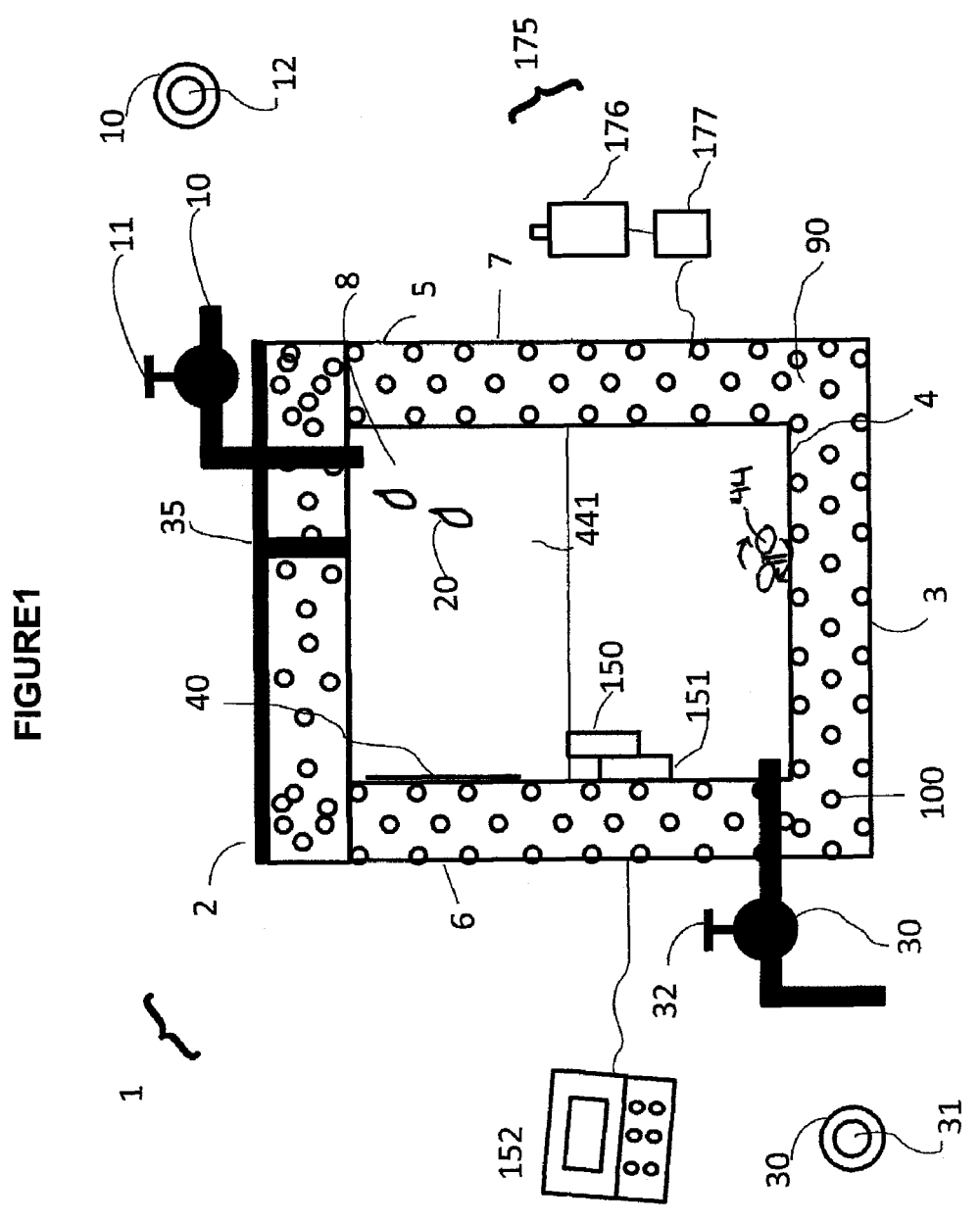

Referring now to the figures, FIG. 1 generally illustrates an example of a vessel 1 of the present device. In an embodiment, the vessel 1 may have a top 2, a bottom 3, a front 4, a back 5, a first side 6, a second side 7 and an interior 8. In an embodiment, the vessel 1 is a pipe. Located on, for example, the top 2 of the vessel 1 may be a liquid inlet valve 10. The liquid inlet valve 10 may have a control knob 11 which allows a user to selectively open or close the liquid inlet valve 10. When the liquid inlet valve 10 is on the open position, the liquid inlet valve 10 may be in communication with the interior 8 of the vessel such that a liquid 20 (or gas) may pass through an interior channel 12 of the liquid inlet valve 10 to the interior 8 of the vessel 1. In another embodiment, the inlet valve 10 may be on any surface of vessel 1.

In an embodiment, the vessel 1 may be made largely from a host polymer material 90 which integrates an organo-metallic element 100. In particular, host polymer material 90 may be made from, for example, thermoplastics, such as, polyethylene (PE), polypropylene (PP), polycarbonate (PC), polystyrene (PS), polyamide (PA), polybutylene terephthalate (PBT), polyethylene terephthalate (PET), polyvinyl chloride (PVC), thermoplastic elastomer (TPE), or wax (e.g., paraffin). Further, the host polymer material 90 may be made from, for example, thermoset plastics, such as epoxy, phenolic, cyanate ester, bismaleimide, polyimide, acrylic, powder coats, silicone, urethane, latex or plastic coatings (such as polyurethanes, etc.) or fiber reinforced plastics, such as fiber glass, etc. In an embodiment, the organo-metallic element 100 may contain, for example, silver (Ag), copper (Cu) and/or zinc (Zn). The vessel 1 may be manufactured using conventional manufacturing equipment. The host polymer material 90 may contain a single metal type of an organo-metallic element 100 or a blend of various organo-metallic elements 100 dispersed throughout the host polymer material 90 wherein some of the organo-metallic elements 100 reside on all the surfaces of the vessel 1. Preferably, the organo-metallic elements 100 may be uniformly distributed throughout the host polymer material 90 and on its surfaces. In an embodiment, the host polymer material 90 containing the organo-metallic elements 100 may be located on less than all the interior 8 surfaces of the vessel 1. For example, the side walls may be standard metal or plastic whereas the bottom 3 surface may be made from the host polymer material 90 containing the organo-metallic element 100. In another embodiment, the host polymer material 90 may be added to the interior surfaces of the vessel 1 as a coating. In an embodiment, the host material 90 may be, for example, paper, cement, concrete and/or ceramic materials. For example, the paper host may be manufactured similarly to pleated cellulose paper cartridge filters (for example, OmniFilter Pleated Paper Filters™) which contain an organo-metallic additive. Similarly, the cement, concrete and/or ceramic materials may contain the organo-metallic additives.

As a result, the interior 8 (and exterior) surfaces of the vessel 1 will contain the organo-metallic elements 100 embedded within the host polymer material 90. When the liquid 20 is introduced into the interior 8 of the vessel 1, the liquid 20 will come into contact with the organo-metallic element 100 of the host polymer material 90 of the interior 8 of the vessel 1 wherein the organo-metallic element 100 may act on the liquid 20 to purify and sanitize the liquid 20, i.e., kill micro-organisms present in the liquid. In an embodiment, the vessel 1 may be made predominantly of a standard metal such as aluminum or steel (lacking the organo-metallic elements) and coated thereafter.

In this embodiment, the interior 8 surfaces of the vessel 1 may be coated with a laminated film 40 or coating containing the organo-metallic elements 100. For example, powder coating or painting may be used. As a result, any liquid 20 within the interior 8 of the vessel 1 may still come into contact with the organo-metallic elements of the device 1. Preferably, in this embodiment, substantially the entire interior 8 surfaces of the vessel 1 are coated so as to increase the surface area for contact with the liquid 20 and therein increasing the purification and sterilization process.

The first side 6 and the second side 7 of the vessel 1 may provide substantial structural integrity for the vessel 1. Preferably, the host polymer material 90 of the vessel 1 is at least 0.01 mm thick whereas in the coating embodiment, coating thickness is generally less than 5 mm.

Located on, for example, the first side 6 or second side 7 of the vessel 1 may be, for example, a liquid outlet valve 30. In an embodiment, the liquid outlet valve 30 is located in a lower position with respect to the ground than the liquid inlet valve 10 such that gravity and or pumps may allow the flowing of the liquid 20 from the liquid inlet valve 10, through to the interior 8 of the vessel 1 and then ultimately out of the interior 8 of the vessel 1 through a channel 31 of the liquid outlet valve 30. A control knob 32 located on the liquid outlet valve 30 may allow a user to selectively control the liquid outlet valve 30. In another embodiment, the liquid outlet valve 30 may be located on any surface of vessel 1. For example, if the vessel 1 is a water heater or connected to a water heater the liquid outlet valve 30 may be located on the top 2 of the vessel 1.

In an embodiment, a vent hole 35 may be located on, for example, the top 2 of the vessel 1. The vent hole 35 may allow a user to control the pressure within the interior 8 of the vessel 1 by selectively allowing the exchange of gas between the interior 8 of the vessel 1 and the atmosphere. Further, the vent hole 35 may function like a poppet valve to prevent outside air from entering the vessel 1 when atmospheric equilibrium has been reached. In addition, the vent hole 35 may further allow a user to gain easy access to the interior 8 of the vessel 1.

Also located on the top 2 of the vessel 1 may be, for example, an optional vessel cover 36 (FIG. 2). The vessel cover 36 may contain a single metal type of an organo-metallic element 100 or a blend of various organo-metallic elements 100 dispersed throughout the host polymer material 90 wherein some of the organo-metallic elements 100 reside on the surfaces of the vessel 1. The vessel cover 36 is shown at the top 2 of the vessel 1, but may be positioned at, for example, the bottom 3 of the vessel 1 or as part of one of the sides. The vessel cover 36 may prevent outside atmospheric pressure and/or gases and particulates (for example dust, pollen, etc.) from entering the interior of the vessel 1 through the vent hole 35, or, when removed from the vessel 1, the vessel cover 36 may allow outside atmospheric gases and particulates (for example dust, pollen, etc.) to enter the interior of the vessel 1.

Referring now to FIG. 2A, in an embodiment, the vessel 1 may have non-load bearing liquid purification components 120 located substantially or entirely within the interior 8 of the vessel 1. In an embodiment, the total surface area of the non-load bearing liquid purification components 120 located within the interior 8 of the vessel 1 is greater than 10% of the total surface area of the load bearing internal surface of the vessel 1. These non-load bearing liquid purification components 120 may be placed within the interior 8 of the vessel 1. The non-load bearing liquid purification components 120 may increase the surface area for the liquid 20 to contact the organo-metallic elements 100. The non-load bearing liquid purification components 120 may be fabricated from the host polymer material 90 which integrates the organo-metallic elements 100 comprised of metals, such as but not limited to, silver (Ag), copper (Cu), and zinc (Zn). Further, in an embodiment, the host material 90 may be, for example, paper, cement, concrete and/or ceramic materials. The non-load bearing liquid purification components 120 may be processed using conventional manufacturing equipment having as an example, but not limited to, components of polymer based structural bulks, films, sheets, coatings, and multi-layer composites. The non-load bearing liquid purification components 120 may be solid or porous. In an embodiment, the non-load bearing liquid purification components 120 and/or the liquid 20 is stirred or agitated by a rotating blade 44 connected to a power source wherein the rotating blade 44 increases purification kinetics and increase the effectiveness of the purification process.

The non-load bearing liquid purification components 120 may have various shapes and formats such as but not limited to rods, fibers, threads, tree-shaped, weaves, rings, balls or other designs. The non-load bearing liquid purification components 120 made of the organo-metallic elements 100 may be porous so as to increase the surface area for interaction between the liquid 20 and the organo-metallic elements 100 so as to maximize purification and/or sterilization of the liquid 20. In an embodiment the non-load bearing liquid purification components 120 may be stationary or may move within the interior 8 of the vessel 1. More specifically, in the moving embodiment, the non-load bearing liquid purification components 120 may move freely within a predefined zone 725 or may be moved by predetermined mechanical means. Further, various sized non-load bearing liquid purification components 120 may be used within the interior 8 of the same vessel 1. Predefined zone 725 may be oriented horizontally, vertically or some combination of horizontal and vertical.

Further, the non-load bearing liquid purification components 120 may be shaped as packing materials (e.g. Raschig rings) used to force the liquid 20 to take complicated paths through the interior 8 of the vessel 1, thereby further increasing the surface area for contact between the liquid 20 and the antimicrobial properties of the organo-metallic elements 100 of the host polymer material 90. These non-load bearing purification components 120 may form zones 725. In an embodiment, the packing materials may be a smooth or corrugated metal, a molded ceramic, or a molded plastic which has been coated with or is comprised of the organo-metallic elements 100 which inherently has the antimicrobial properties. Furthermore, the smooth or corrugated metal, molded ceramic and molded plastic may be porous. Moreover, the components may be stationary, non-moving, or moved via environmental perturbations such as wind, thermal gradients, or moved via a motor which is powered via electricity which is generated and stored via environmental perturbations, off-grid supplied electrical energy (e.g. solar, thermoelectric, piezoelectric, etc.) or grid supplied electrical energy. Moving the components or stirring the liquid increases the liquid purification kinetics.

In an embodiment, the non-load bearing liquid purification components 120 may be positioned between, for example, at least one plate 130 which serves to keep the non-load bearing liquid purification components 120 localized within a predetermined zone 725 of the interior 8 of the vessel 1. Furthermore, in an embodiment, several zones 725 may be present within the interior 8 of the vessel 1. More specifically, the plates 130 may be secured to an interior wall or the interior top or bottom of the vessel 1. The non-load bearing liquid purification components 120 may therein be secured between two or more plates 130 or between a single plate 130 and an interior surface of the vessel 1. As a result, the non-load bearing liquid purification components 120 may be prevented from moving freely within the interior 8 of the vessel 1; therein preventing the non-load bearing liquid purification components 120 from accidently leaving the interior 8 of the vessel 1 through, for example, the liquid outlet valve 30. In an embodiment, the non-load bearing liquid purification components 120 may be, for example, shaped as pellets, spheres, flakes, particulates, filters from woven or non-woven fibers, porous membranes or any other suitable shape.

Figure 11:
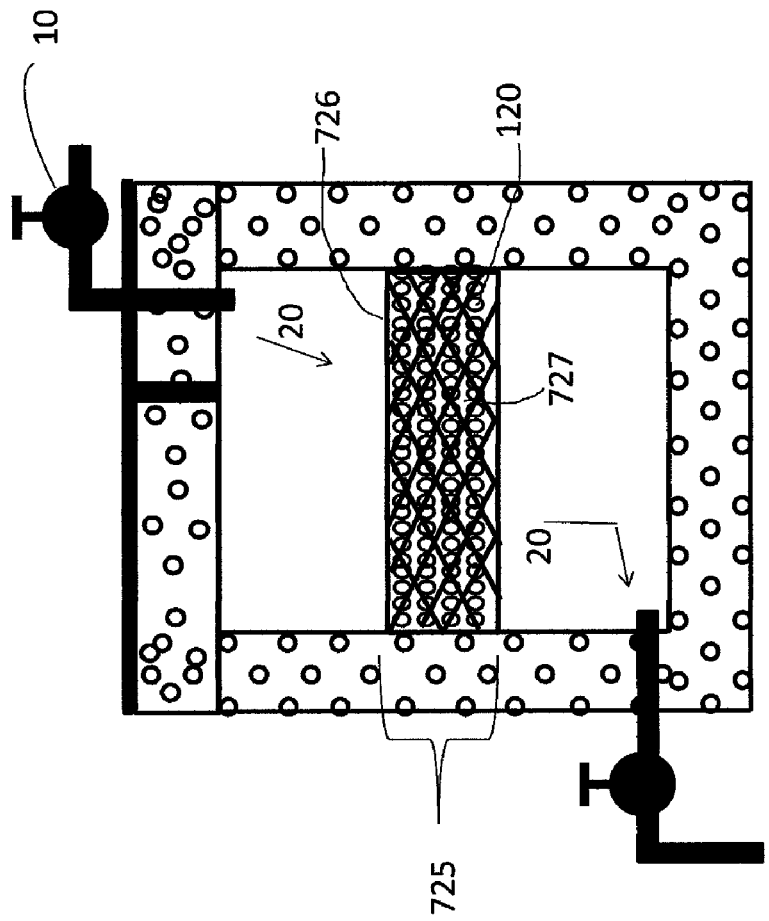
FIG. 11 illustrates a zone for the non-loadbearing liquid purification components.

Referring now to FIG. 11, as mentioned above, the interior 8 of the vessel 1 may have predetermined zones 725 for securing the non-load bearing liquid purification components 120. In an embodiment, the predetermined zones 725 may be defined by walls 726 having openings 727. In particular, these walls 726 may resemble, for example, non-corrosive chicken wire, screening, perforated sheet, etc. The opening 727 of the walls 726 may be smaller than the non-load bearing liquid purification components 120 so that the non-load bearing liquid purification components 120 cannot escape from or move through the openings 727 of the walls 726 of the predetermined zones 725, while still allowing liquid 20 to flow through it.

In an embodiment, the predetermined zones 725 may extend substantially parallel with the top 2 and the bottom 3 of the vessel 1. More specifically, the zones 725 may extend from the first 6 to the second side 7 of the interior 8 of the vessel 1 such that as the liquid 20 moves from the top 2 (where the inlet valve 10 may be located) to the bottom 3 of the vessel 1, the liquid 20 must pass through the predetermined zone 725 where it is exposed to the non-load bearing liquid purification components 120 and thus purified. In an alternative embodiment, the predetermined zone 725 may run vertically (FIG. 2) as long as the liquid inlet valve 10 is on the opposite side of the zone 725 as the liquid outlet valve 30 such that the liquid 20 must pass through the zone 725 prior to exiting the interior 8 of the vessel 1. In an embodiment, the non-load bearing liquid purification components 120 are tightly packed within the zones 725 so as to maximize the surface area in which the liquid 20 is exposed to and thus increasing the purification process.

In an embodiment, the vessel 1 may have a sensor 150 located, for example, within the interior 8 of the vessel 1, which monitors at least one attribute of the water-based liquid 20 such as, but not limited to, microbe concentration (bacteria, fungus, mold, etc.) salinity, temperature, pH, etc. The sensor 150 may be powered by environmental perturbations such as wind, thermal gradients, etc., off-grid supplied electrical energy (e.g. solar), or grid supplied electrical energy.

In an embodiment, the device 1 may have an electrical circuit 151 electrically connected to the sensor 150 wherein the electrical circuit 151 transmits electrical information to a remote computer 152. Information may also be transmitted to a remote computer 152 by radio, RF, optical or other means. In embodiments, the electrical signals may be encrypted or non-encrypted. A variety of existing wireless communications protocols may be used such as, but not limited to, Bluetooth, Wi-Fi, ZigBee, or IEEE 802.11. Further, the communications link may be always-on or have a sleep mode attribute depending on the system power budget design. While the sensor 150 may be in contact with the liquid, the electrical circuit 151 may be located inside vessel 1 or outside vessel 1 and connected to the sensor 150 via wiring.

In an embodiment, device 1 may be powered by an energy system 175 which receives energy from the electrical power grid or from harvesting of solar, wind, thermal, or vibrational energy. The energy system 175 may also incorporate an energy storage device 176 such as a battery, capacitor or a battery connected to a capacitor 177.

The metals selected to be used as the organo-metallic element 100 of the device 1 are selected based on the inherent antimicrobial physical properties of the metals (e.g. anti-bacterial, anti-fungal, anti-mold, etc.). In particular, the metals used as the organo-metallic elements 100 may be chosen from the categories of transition metals, post-transition metals, metalloids, lanthanides, actinides, alkaline earth metals, and alkali metals.

In addition to the use of silver, copper and zinc mentioned above, or possible metals used as the organo-metallic element 100 may include alkali and alkali earth materials and similar elements from the left-side of the Periodic Table of the Chemical Elements, including, but are not limited to lithium (Li), sodium (Na), potassium (K), rubidium (Rb) cesium (Cs), beryllium (Be), magnesium (Mg), calcium (Ca), strontium (Sr), and barium (Ba).

An additional class of materials can be formed as organic-non-metallic systems from halogens and similar elements from the right-side of the Periodic Table of the Chemical Elements, including, but are not limited to fluorine (F), chorine (Cl), bromine (Br), iodine (I), sulfur (S), selenium (Se), and phosphorus (P).

In an embodiment, the host polymer material 90 is made predominantly from thermoplastics and thermosets. More specifically, the host polymer material 90 may be embedded with the organo-metallic elements 100. The host polymer material 90 systems may be comprised of a stable dispersion (emulsion) of polymer microparticles in an aqueous medium such as, but not limited to natural and synthetic latexes. The host matrix polymer may be a single polymer, a polymer blend, a co-polymer, or a co-polymer blend.

Preferably the host polymer material 90 is formulated to achieve specific materials properties e.g. optical (clarity, refractive index, etc), mechanical (glass transition temperature, coefficient of thermal expansion, modulus, toughness, adhesion, etc), electrical (dielectric strength, etc) as required for optimal end product performance.

The vessel 1 may be made from, as an example, but not limited to: bulks, films, sheets, coatings, and multi-layer composites containing an organo-metallic element 100 comprised of a metal such as but not limited to copper (Cu), silver (Ag), gold (Au), iridium (Ir), palladium (Pd), platinum (Pt), iron (Fe), nickel (Ni), cobalt (Co), zinc (Zn), niobium (Nb), ruthenium (Ru), rhodium (Rh), tellurium (Te), antimony (Sb), bismuth (Bi), tin (Sn), gallium (Ga), indium (In), titanium (Ti), vanadium (V), chromium, (Cr), manganese (Mn), molybdenum (Mo), tungsten (W), tantalum (Ta), hafnium (Hf), zirconium (Zr), scandium (Sc), and yttrium (Y) in a host matrix polymer comprised of at least one of the following thermoplastics such as but not limited to polyethylene (PE), polypropylene (PP), polycarbonate (PC), polystyrene (PS), polyamides (PA), polybutylene terephthalate (PBT), polyethylene terephthalate (PET), polyvinyl chloride (PVC), thermoplastic elastomer (TPE), fiber reinforced polymer (e.g. fiberglass, etc) and/or wax (e.g. paraffin).

Alternatively, the vessel 1 may be made from, as an example, but not limited to: bulks, films, sheets, coatings, and multi-layer composites containing an organo-metallic element 100 comprised of a metal such as but not limited to copper (Cu), silver (Ag), gold (Au), iridium (Ir), palladium (Pd), platinum (Pt), iron (Fe), nickel (Ni), cobalt (Co), zinc (Zn), niobium (Nb), ruthenium (Ru), rhodium (Rh), tellurium (Te), antimony (Sb), bismuth (Bi), tin (Sn), gallium (Ga), indium (In), titanium (Ti), vanadium (V), chromium, (Cr), manganese (Mn), molybdenum (Mo), tungsten (W), tantalum (Ta), hafnium (Hf), zirconium (Zr), scandium (Sc), and yttrium (Y) dispersed into a thermoset such as but not limited to epoxies, phenolics, cyanate esters, bismaleimides, polyimides, acrylics, powder coats, fiber reinforced polymer (e.g. fiberglass, etc), silicones, urethanes and latexes.

The non-load bearing liquid purification components 120 may be made from, as an example, but not limited to: bulks, films, sheets, coatings, and multi-layer composites containing organo-metallics comprised of a metal such as but not limited to copper (Cu), silver (Ag), gold (Au), iridium (Ir), palladium (Pd), platinum (Pt), iron (Fe), nickel (Ni), cobalt (Co), zinc (Zn), niobium (Nb), ruthenium (Ru), rhodium (Rh), tellurium (Te), antimony (Sb), bismuth (Bi), tin (Sn), gallium (Ga), indium (In), titanium (Ti), vanadium (V), chromium, (Cr), manganese (Mn), molybdenum (Mo), tungsten (W), tantalum (Ta), hafnium (Hf), zirconium (Zr), scandium (Sc), and yttrium (Y) in a host matrix polymer comprised of at least one of the following thermoplastics such as but not limited to polyethylene (PE), polypropylene (PP), polycarbonate (PC), polystyrene (PS), polyamides (PA), polybutylene terephthalate (PBT), and polyethylene terephthalate (PET), polyvinyl chloride (PVC) thermoplastic elastomer (TPE), fiber reinforced polymer (e.g., fiberglass, etc.) and wax (e.g. paraffin). Furthermore, the non-load bearing liquid purification components 120 may be shaped as an example but not limited to rods, fibers, threads, weaves, rings, tree-like structures and/or sphericals (balls).

Alternatively, the non-load bearing liquid purification components 120 may be made from, as an example, but not limited to: bulks, films, sheets, coatings, and multi-layer composites containing organo-metallic comprised of a metal such as but not limited to copper (Cu), silver (Ag), gold (Au), iridium (Ir), palladium (Pd), platinum (Pt), iron (Fe), nickel (Ni), cobalt (Co), zinc (Zn), niobium (Nb), ruthenium (Ru), rhodium (Rh), tellurium (Te), antimony (Sb), bismuth (Bi), tin (Sn), gallium (Ga), indium (In), titanium (Ti), vanadium (V), chromium, (Cr), manganese (Mn), molybdenum (Mo), tungsten (W), tantalum (Ta), hafnium (Hf), zirconium (Zr), scandium (Sc), and yttrium (Y) dispersed into a thermoset such as but not limited to epoxies, phenolics, cyanate esters, bismaleimides, polyimides, acrylics, powder coats, silicones, urethanes and latexes. Furthermore, the liquids purification components can be shaped as an example but not limited to rods, fibers, threads, weaves, rings, tree-like structures and/or sphericals.

The vessel 1 of the present device may be stationary or portable. Examples of generally stationary vessels are, for example, cisterns, water holding tanks for single or multi-unit dwellings, office buildings, and factories. Examples of generally portable vessel are, for example, one-liter water jugs, 5-gallon water jugs, carboys, personal water bottles, squeeze bottles, food containers, plastic bags, tank cars, railroad cars, etc.

Referring now to FIG. 3, in an embodiment, the non-load bearing liquid purification components 120 may take the form of a sphere 400. The non-load bearing liquid purification components 120 may be constructed of the same material (the matrix) as the load-bearing liquid purification components of the vessel 1. In particular, the material used to create, for example, the sphere 400 in FIG. 3 may be the same material (the matrix) used to create the top, the bottom and the walls of the vessel 1 of FIG. 1. In an embodiment, a plurality of spheres 400 may be located within the interior 8 of the vessel 1 so as to increase the surface area which contacts and, thus purifies the liquid 20. As a result, the overall surface area of the exterior surface of the sphere 400 or plurality of spheres 400 may be approximately between 0.1 up to, and even greater than 1.0 in comparison with the surface area of the interior 8 of the vessel 1. The spheres 400 may have an inert central core portion 401 and an active exterior surface 402 wherein the active exterior surface 402 contains the organo-metallic element 100 which acts upon the liquid 20. In an alternative embodiment, the entire sphere 400 is homogeneous and contains the organo-metallic elements 100. The sphere 400 may also be porous. The sphere 400 surface may also have dimples 412 (FIG. 3) like a golf ball or textured to increase its surface area.

Figure 4A:
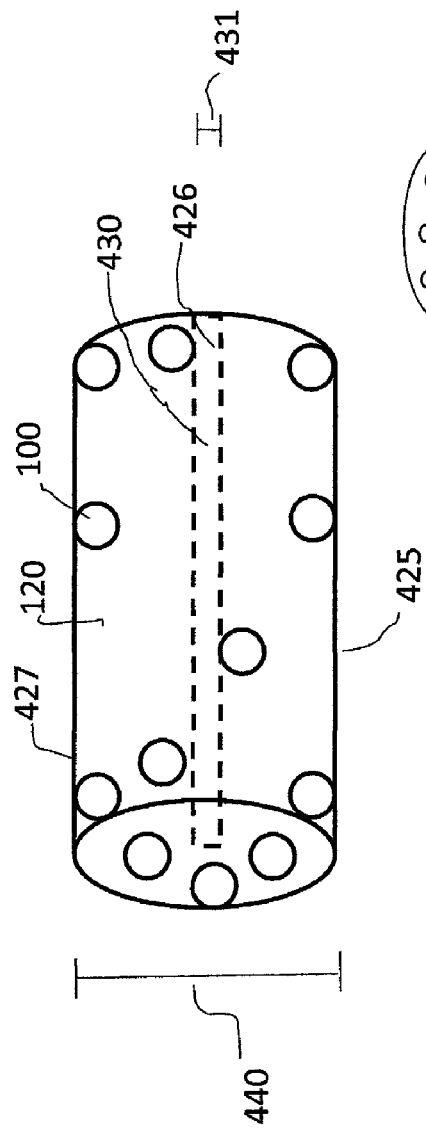
FIG. 4a illustrates a cross-sectional view of an embodiment of the non-load bearing liquid purification component wherein the non-load bearing liquid purification component is in the form of a rod.
Figure 4B:
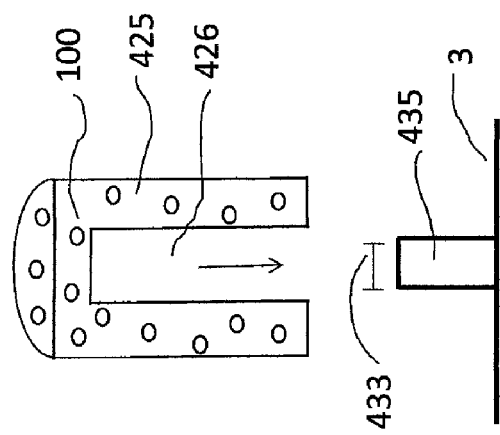
FIG. 4b illustrates the non-load bearing liquid purification rod being inserted on a pole secured to the interior bottom of the vessel.

Referring now to FIG. 4, in an embodiment, the non-load bearing liquid purification components 120 function the same as the sphere 400 as identified above, but may take the form of a rod 425. In particular, in an embodiment, a plurality of rods 425 may be located within the interior 8 of the vessel 1 so as to increase the surface area which contacts and, thus purifies the liquid 20. As a result, the overall surface area of the exterior surface of the rods 425 may be approximately between 0.1 up to, and even greater than 1.0 in comparison with the surface area of the interior 8 of the vessel 1. The rod 425 may be generally cylindrical in shape having an interior portion 426 and an exterior portion 427 wherein the exterior portion 427 contacts, and thus purifies the liquid 20. The organo-metallic element 100 of the rod 425 may be located at least on the exterior portion 427 of the rod 425. In an alternative embodiment, the entire rod 425 is homogenous and contains organo-metallic elements 100. In an embodiment, the rod 425 may have a generally cylindrical channel 430 having a diameter 431 and a length 432 wherein the generally cylindrical channel 430 runs through the interior portion 426 of the rod 425. The rod 425 may also be porous. The rod 425 surface may be textured to increase its surface area. Still further, in an embodiment, the non-load bearing liquid purification component 120 may take the form of pellets.

In an embodiment, a generally cylindrical pole 435 having a diameter 433 slightly less than the diameter 431 of the cylindrical channel 430 may be secured within the interior 8 of the vessel 1 such that a user may selectively secure the rod 425 onto the generally cylindrical pole 435. The rod 425 may be secured onto the cylindrical pole 435 by, for example, an adhesive, gravity, mechanically and/or friction. When the rod 425 is secured onto the cylindrical pole 435, the rod 425 may be secured in place within the interior 8 of the vessel 1 and thus prevented from moving. In an embodiment, multiple rods 425 may be used in the interior 8 of the same vessel 1. Furthermore, the rod 425 may have a hole along its axis so that it functions as a tube or a pipe, or it may have holes perforating it perpendicular to the axis or at some angle to the axis to encourage water flow through multiple pathways, or the surface may be dimpled like a golf ball or have a roughened surface to increase the surface area in contact with flowing water (or other liquid such as a juice).

In an embodiment, the rod 425 has an external diameter 440. In an embodiment, the vessel 1 is cylindrical having an internal diameter 441. Preferably, the ratio between the external diameter 440 of the rod 425 and the internal diameter 441 of the cylindrical vessel 1 is between about 0.1 and 0.9. In an embodiment, the rod 425 extends from the top 2 of the interior 8 of the vessel 1 to the bottom 3 of the interior 8 of the vessel 1. Multiple rods 425 may also be present in the interior 8 of the vessel 1. As a result, the overall surface area of the exterior surface of the rod 425 may be approximately between 0.1 up to, and even greater than 1.0 in comparison with the surface area of the interior 8 of the vessel 1.

Referring now to FIG. 5, in an embodiment, the non-load bearing liquid purification components 120 may take the form of a base having branches 450. More specifically, the base having branches 450 may resemble, for example, a tree or similar structure. In particular, the non-load bearing liquid purification components 120 may have a base portion 451 which, in an embodiment, is secured within the interior 8 of the vessel 1 and a plurality of branch portions 452 wherein the branch portions 452 are at least partially secured to the base portion 451. In this embodiment, the branch portions 452 may have multiple extensions 453 themselves wherein the multiple extensions 453 have multiple extensions 454 and wherein the farther away from the base portion 451 to smaller and thinner the branch portions 452 become. As a result, the non-load bearing liquid purification components 120 may substantially increase the surface area which contacts the liquid 20 and thus purifies the liquid 20. Multiple bases having branches 450 may also be present in the interior 8 of vessel 1. As a result, the overall surface area of the exterior surface of the base having branches 450 may be approximately between about 0.1 up to, and even greater than 1.0 in comparison with the surface area of the interior 8 of the vessel 1. Tree 450 is homogenous or inhomogeneous and contains organo-metallic elements 100. The tree 450 may also be porous. The tree 450 surface may be textured to increase its surface area.

Referring now to FIG. 5c, in an embodiment, the smaller thinner branch portions 452 of the base having branches 450 may extend outside of the predetermined zones 725 through the openings 727 while the main body of the base having branches 450 is still secured within the predetermined zones 725 as a result of its larger size. More specifically, the smaller thinner branch portions 452 may be small enough so as to fit through the openings 727 while the main body of the base having branches 450 is still secured within the predetermined zones 725. As a result, more of these tree-shaped non-load bearing purification components 120 may be secured within the predetermined zone 725 of the vessel 1 then would otherwise be able to fit if the entire non-load bearing liquid purification component 120 had to fit completely within the predetermined zones 725.

Figure 6:
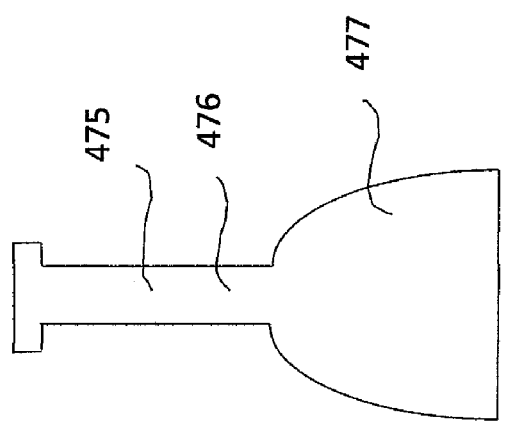
FIG. 6 illustrates a cross-sectional view of an embodiment of the non-load bearing liquid purification component wherein the non-load bearing liquid purification component is in the form of a paddle.

Referring now to FIG. 6, the non-load bearing liquid purification components 120 may take the form of a paddle 475. More specially, in an embodiment, the paddle 475 may have a thin support portion 476 and a generally flat thicker circular portion 477 wherein the generally flat thicker circular portion 477 is secured to the thin support portion 476. Multiple paddles 475 may also be present in the interior 8 of vessel 1. As a result, the overall surface area of the exterior surface of the paddle 475 may be approximately between about 0.1 up to, and even greater than 1.0 in comparison with the internal surface area of the interior 8 of the vessel 1. Paddle 475 is homogenous or inhomogeneous and contains organo-metallic elements 100. The paddle 475 may also be porous. The paddle 475 surface may be textured to increase its surface area.

Figure 7:
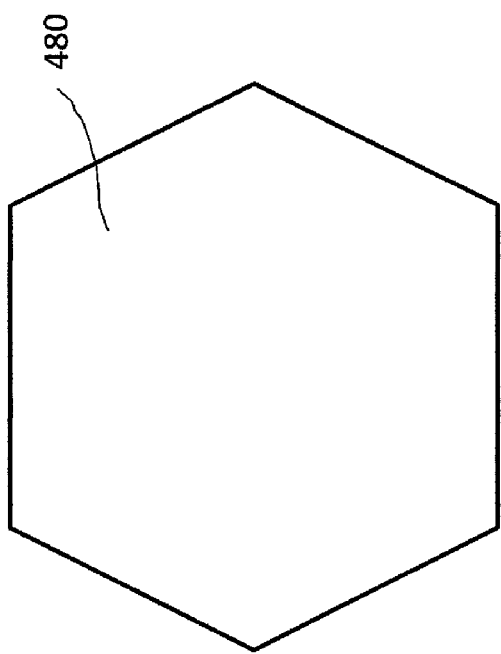
FIG. 7 illustrates a cross-sectional view of an embodiment of the non-load bearing liquid purification component wherein the non-load bearing liquid purification component is in the form of a hexagon.

Referring now to FIG. 7, the non-load bearing liquid purification component 120 may take the form of a hexagon 480. In the hexagon 480 configuration, the six sides of the hexagon 480 may have the organo-metallic element 100 which acts upon the liquid 20 and therein may allow for increased surface area for interacting with and treating the liquid 20 while at the same time not allowing the full rotation of the non-load bearing liquid purification components 120 as would otherwise occur in a spherical non-load bearing liquid purification component 120. As a result, a user may better control the movement of the non-load bearing liquid purification components 120. Preferably, the ratio between the surface area of the hexagon 480 and the internal surface area of the cylindrical vessel 1 is between 0.1 and 0.9. Multiple hexagons 480 may also be present in the interior 8 of vessel 1. As a result, the overall surface area of the exterior surface of the hexagon 480 may be approximately between about 0.1 up to, and even greater than 1.0 in comparison with the surface area of the interior 8 of the vessel 1. Hexagon 480 is homogenous or inhomogeneous and contains organo-metallic elements 100. The hexagon 480 may also be porous. The hexagon 480 surface may be textured to increase its surface area.

Figure 8:
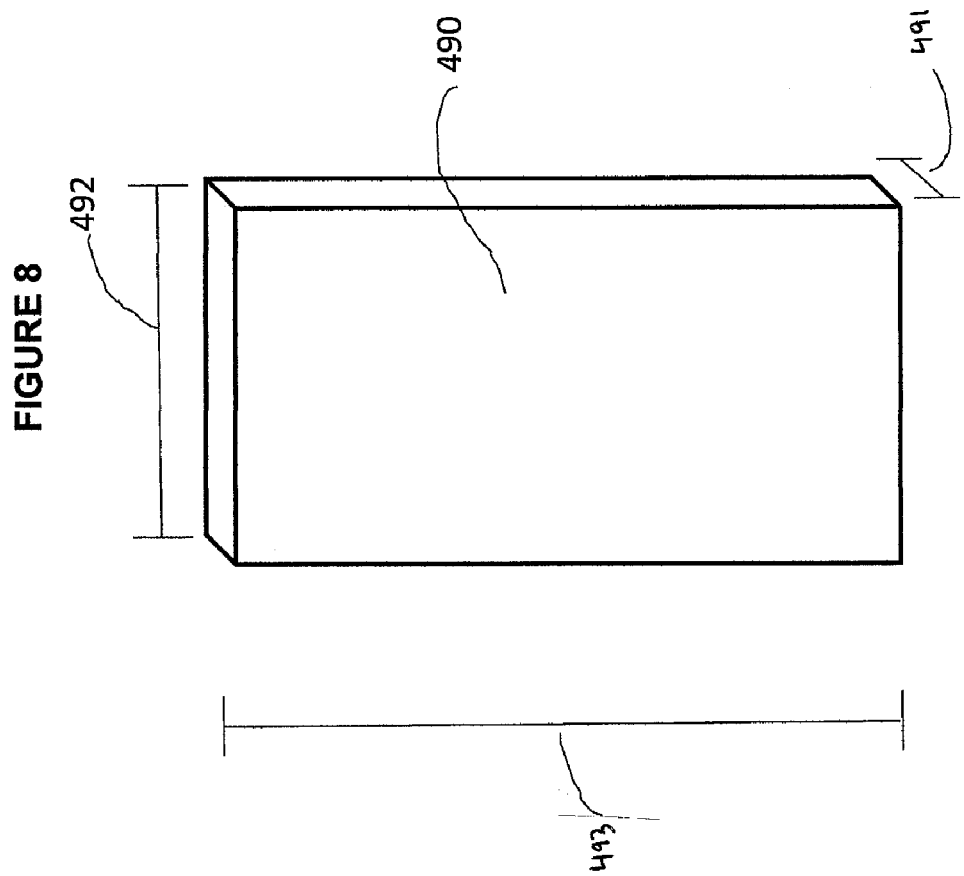
FIG. 8 illustrates a cross-sectional view of an embodiment of the non-load bearing liquid purification component wherein the non-load bearing liquid purification component is in the form of a rectangle.

Referring now to FIG. 8, the non-load bearing liquid purification component 120 may take the form of a rectangle 490. In this embodiment, the exterior surfaces of the rectangle 490 may have the organo-metallic element 100 which acts upon the liquid 20. The rectangle 490 may have a length 491, a width 492 and a height 493 wherein the height 493 extends substantially the entire distance between the bottom 3 and the top 2 of the interior 8 of the vessel 1. Preferably, the ratio between the surface area of the rectangle 490 and the internal surface area of the cylindrical vessel 1 is between about 0.1 and 0.9. Multiple rectangles 490 may also be present in the interior 8 of vessel 1. As a result, the overall surface area of the exterior surface of the rectangle 490 may be approximately between about 0.1 up to, and even greater than 1.0 in comparison with the surface area of the interior 8 of the vessel 1. Rectangle 490 is homogenous or inhomogeneous and contains organo-metallic elements 100. The rectangle 490 may also be porous. The rectangle 490 surface may be textured to increase its surface area.

Figure 9:
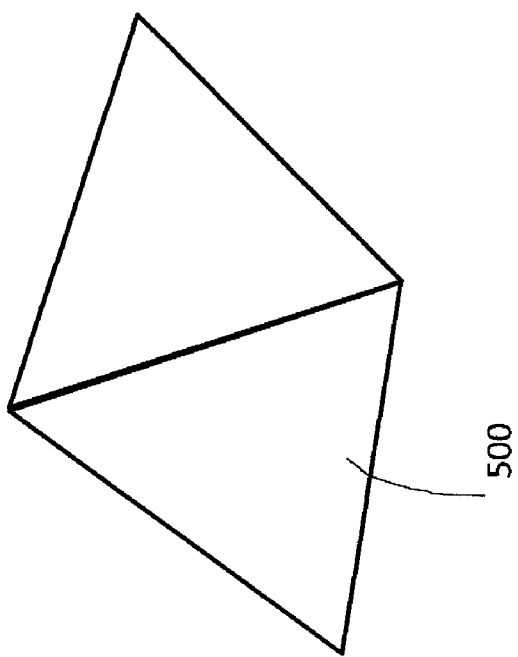
FIG. 9 illustrates a cross-sectional view of an embodiment of the non-load bearing liquid purification component wherein the non-load bearing liquid purification component is in the form of a pyramid.

Referring now to FIG. 9, the non-load bearing liquid purification component 120 may take the form of a pyramid 500. In an embodiment, the non-load bearing liquid purification component 120 may be a tetrahedron. The exterior surfaces of the pyramid 500 may have the organo-metallic element 100 which acts upon the liquid 20. Preferably, the ratio between the surface area of the pyramid 500 and the internal surface area of the cylindrical vessel 1 is between about 0.1 and 0.9. Multiple pyramids 500 may also be present in the interior 8 of vessel 1. As a result, the overall surface area of the exterior surface of the pyramids 500 may be approximately between about 0.1 up to, and even greater than 1.0 in comparison with the surface area of the interior 8 of the vessel 1. Pyramid 500 is homogenous or inhomogeneous and contains organo-metallic elements 100. The pyramid 500 may also be porous. The pyramid 500 surface may be textured to increase its surface area.

Figure 10:
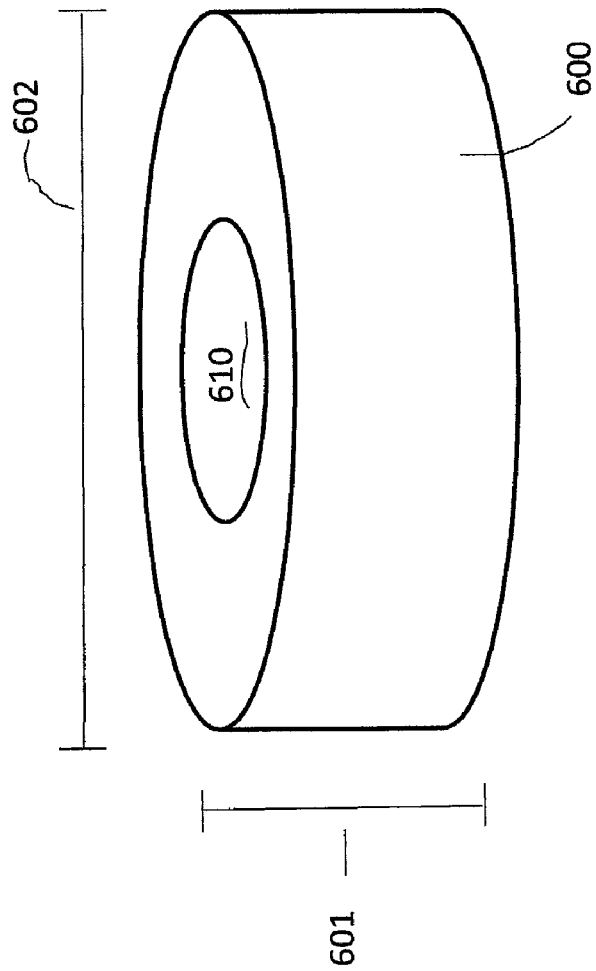
FIG. 10 illustrates a cross-sectional view of an embodiment of the non-load bearing liquid purification component wherein the non-load bearing liquid purification component is in the form of a ring (or puck).

Referring now to FIG. 10, the non-load bearing liquid purification component may take the form of a ring 600 (or puck). The exterior surfaces of the ring 600 or puck may have the organo-metallic element 100 which acts upon the liquid 20. In this embodiment, the ring 600 or puck may have a height 601 and a diameter 602. Preferably, the ratio between the diameter 602 of the ring 600 or puck and the internal surface area of the cylindrical vessel 1 is between about 0.1 and 0.9. In the ring embodiment, an internal opening 610 may be present allowing the liquid 20 to pass through and contact the surface area of the opening 610 of the ring 600. Multiple rings 600 or pucks may also be present in the interior 8 of vessel 1. As a result, the overall surface area of the exterior surface of the rings 600 or puck may be approximately between about 0.1 up to, and even greater than 1.0 in comparison with the surface area of the interior 8 of the vessel 1. Ring 600 or puck is homogenous or inhomogeneous and contains organo-metallic elements 100. The ring 600 or puck may also be porous. The ring 600 or puck surface may be textured to increase its surface area.

Other non-load bearing liquid purification component structures may be placed within the cylindrical vessel 1 such as but not limited to polygons, cones and random shapes. Multiple structures may also be present in the interior 8 of vessel 1. As a result, the overall surface area of the exterior surface of the multiple structures may be approximately between about 0.1 up to, and even greater than 1.0 in comparison with the surface area of the interior 8 of the vessel 1.

Figure 12:
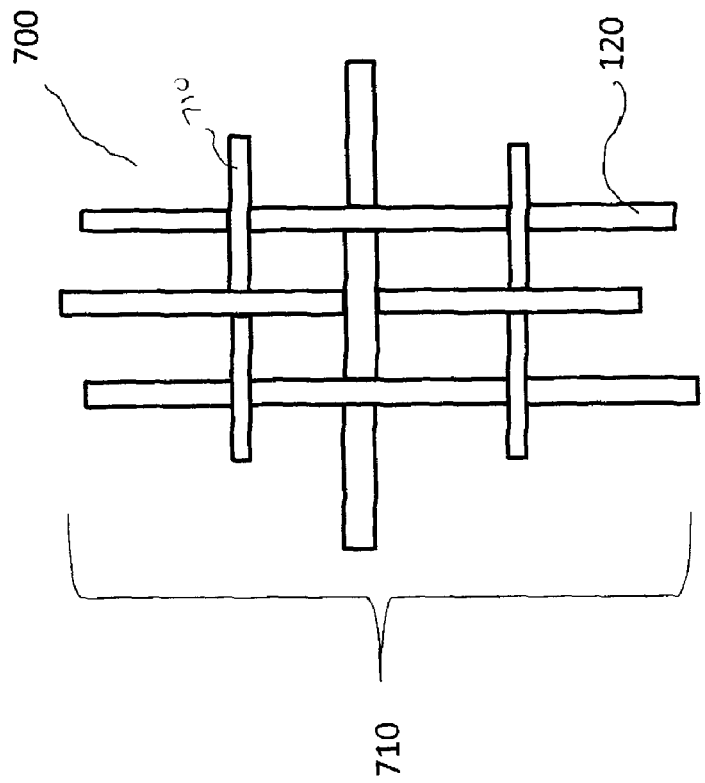
FIG. 12 illustrates an embodiment wherein the non-load bearing liquid purification component is in the form of a string or other textile.

Referring now to FIG. 12, the non-load bearing liquid purification component 120 may take the form of a woven or non-woven textiles 700 composed of fibers, threads, yarns, ribbons, sheets, etc. The exterior surfaces of the textiles 700 may have the organo-metallic element 100 which acts upon the liquid 20. In this embodiment, the textile 700 has a surface area 710. Preferably, the ratio between the surface area of the textile 700 and the internal surface area of the cylindrical vessel 1 is between about 0.1 and 0.9. In the textile 700 embodiment, the textile 700 is porous and allows liquid to flow across and through its surface. Multiple textiles 700 may also be present in the interior 8 of vessel 1. As a result, the overall surface area of the exterior surface of the textiles 700 may be approximately between about 0.1 up to, and even greater than 1.0 in comparison with the surface area of the interior 8 of the vessel 1. Textile 700 is homogenous or inhomogeneous and contains organo-metallic elements 100. The textile 700 may be textured to increase its surface area.

In an embodiment, the preferred organo-metallic antimicrobial additive of the present device 1 may be an organo-metallic antimicrobial additive based on stearate chemistry. The metal components may be those listed above for use with the organo-metallic antimicrobial additives. In an embodiment, the preferred organo-metallics antimicrobial additives may be copper stearate, silver stearate and zinc stearate or blends of two or three of these additives. These stearate based organo-metallic antimicrobial additives may be preferable for use in the device 1 as they are water insoluble or sparingly soluble in water and are comprised of a long-chain fatty acid group, and wherein a majority of metallic species dispersed throughout the host matrix are in the one or more antimicrobial organo-metallic antimicrobial additives. As a result, the physical structures of the load bearing walls or the non-load bearing structures will not be compromised by the organo-metallic antimicrobial additives washing away with the fluid held within the container. Instead, the organo-metallic antimicrobial additives remain within the host matrix permanently and the device may be used over and over.

To demonstrate the functionality of the present liquid purification system, a test was assembled and performed. To form the liquid sanitizing medium, two types of polypropylene rod-like pellets containing the organo-metallic antimicrobial additives were formed via conventional thermal extrusion processes, wherein the rod-like cylindrical pellets had dimensions of approximately 1 mm in diameter and approximately 2 mm in length. One type of polypropylene pellet contained about 2 percent by volume of copper stearate and the other type of polypropylene pellet contained about 10 percent by volume of copper stearate. Since both samples were formed using thermal extrusion processes, the copper stearate of both was uniformly distributed throughout the rod-like cylindrical pellets bulk, and did not reside on only the surface of the rod-like cylindrical pellet. As a result, the rod-like cylindrical pellets were able to continue to work even if the surface of the rod-like cylindrical pellets eroded (for example, by abrasion) as the newly exposed undersurface of the rod-like cylindrical pellets also contain copper stearate mixed evenly within for providing the antimicrobial functionality Other fabrication techniques which distribute the copper stearate throughout the pellets bulk could be used as well.

A simple single-stage filter system was constructed to control the flow of the liquid (in this case water) across the rod-like cylindrical pellet's surfaces. The rod-like cylindrical pellets were entrapped within the interior of a plastic (PVC) cylindrical tube section approximately four inches in length and approximately two inches in diameter. The two inch diameter cylindrical tube was longer than the section entrapping the filter medium (the organo-metallic rod-like pellet), so that the liquid (water) was moved from a first opening of the PVC to a second opening of the PVC wherein the liquid was forced to flow past and interact with the rod-like cylindrical pellet containing the organo-metallic antimicrobial additives. The water flow used gravity (i.e., a gravity-fed system) to convey the water from the first end to the second end.

The test water was autoclaved distilled water inoculated with E. coli (ATCC8739). The nutrient plates were Lysogeny Broth (LB) (10 g of tryptone, 5 g of yeast, and 10 g of NaCl with 800 ml of water) in Petri dishes. Colony Forming Units (CFU) were counted after 24 hours and 48 hours incubation.

Test water containing E. coli was poured through the PVC cylindrical tube filter (at a flow rate of approximately 2 liters/minute) and collected at the exit point following a single pass (i.e., the water was only filtered one time). The E. coli water was passed through filter units containing polypropylene pellets with copper stearate at loading levels at either 0%, 2% or 10% pellets. After passing through their respective filter elements the test water was incubated on the nutrient plates for 24 hours and 48 hours and the CFUs counted to determine filter element performance. Ten nutrient plates were incubated for each type of filter element, the CFUs were counted for each nutrient plate and the results are reported after 48 hours in Table 1. Demonstrating the efficacy of the filter system, the polypropylene pellets containing 2% or 10% copper stearate killed all the E. coli in the water flowing through the PVC filer element containing the rod-like cylindrical pellets having the organo-metallic antimicrobial additives.

TABLE 1

|  | 0% Loading | 2% Loading | 10% Loading |
| --- | --- | --- | --- |
| E. coli CFU | 52 | 0 | 0 |

It is well known that copper is a fungicidal agent. For example, United States Patent Publication No.: 2008/0004177 to Pfeiffer et al. entitled: "Novel Copper-Containing Formulations", discloses fungicidal agrochemical compositions using copper-containing fungicidal formulations. One of the copper containing agents listed in that publication is copper stearate. However, the Pfieffer publication does not disclose the use of copper as an antimicrobial agent. In fact, in that publication, the method discloses only the use of commercial bactericides, rather than making use of the antimicrobial properties of copper stearate. Furthermore, in the Pfeiffer publication there is no disclose of the use of the copper-containing agent embedded in a host system, for example a polymer, ceramic, concrete, paper, etc. to provide antimicrobial functionality in a water environment for sanitizing water.

U.S. Pat. No. 8,409,598 to Hishida entitled: "Copper Ion-Producing Compositions" discloses a water purification material system using copper ions. The copper ions are produced from metallic copper powder coated with a water-soluble acidic material. In the present application, copper metal is not used, and the antimicrobial activity arises strictly from the copper stearate, which is not a material system identified in the Hishida patent. Furthermore, the performance of the copper stearate systems on E. coli in the present application is equivalent or better than that demonstrated by Hishida in Table 9.

The present purification system may reduce the concentration of microbes in a liquid by approximately 99% or greater. Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A vessel for containing and purifying a liquid comprising:
a non-porous housing having a top, a bottom, a plurality of sides and an interior wherein the top, the bottom and the plurality of sides have an interior surface area and form a solid load-bearing surface of the non-porous housing;
an opening forming an inlet to the interior of the non-porous housing;
an opening forming an outlet of the non-porous housing wherein a liquid moves through the inlet to the interior of the non-porous housing and then out through the outlet; and
a solid non-load bearing liquid purification component located within the interior of the non-porous housing wherein the solid non-load bearing liquid purification component is a stearate organo-metallic comprising a copper, zinc or silver metal element and a second element which is an organic-non-metallic combined in a polymer matrix and wherein the stearate organo-metallic with copper, zinc or silver metal element of the matrix purifies the liquid prior to the liquid exiting through the outlet of the non-porous housing;
a predetermined zone located within the interior of the non-porous housing wherein the predetermined zone is defined by at least one wall having openings wherein the liquid may pass through the openings of the wall and wherein the solid non-load bearing liquid purification components are prevented from passing through the openings of the wall; and
wherein the solid load-bearing interior walls of the non-porous housing of the vessel are comprised of the stearate organo-metallic with copper, zinc or silver metal element liquid purification component which purifies the liquid.

2. The vessel of claim 1 further comprising:
a valve located at the inlet or outlet.

3. The vessel of claim 1 further comprising:
a generally vertical surface located on the side of or within the interior of the vessel; and
a vent opening located at the top of the non-porous housing or on the generally vertical surface.

4. The vessel of claim 3 further comprising:
a removable cover plate covering the vent of the non-porous housing and preventing the exchange of atmospheric pressure and/or gasses from moving between the outside of the non-porous housing and the interior of the non-porous housing.

5. The vessel of claim 1 further comprising:
wherein a portion of the solid non-load bearing liquid purification components extend outside of the wall of the predetermined zone but may not pass through the wall of the predetermined zone.

6. The vessel of claim 1 wherein the solid non-load bearing liquid purification components are in the form of a rod, a sphere, a tree-shaped structure, a pyramid, a hexagon, a rectangle, a puck a paddle, a ring, a thread, a ribbon, or a woven textile.

7. The vessel of claim 1 wherein the matrix is a solid.

8. The vessel of claim 1 wherein the solid non-load bearing liquid purification components are porous.

9. The vessel of claim 1 wherein the solid non-load bearing liquid purification components are a solid.

10. The vessel of claim 1 wherein the solid non-load bearing liquid purification components are removable and replaceable from the interior of the non-porous housing.

11. The vessel of claim 1 further comprising:
a rotating blade located within the interior of the non-porous housing wherein the rotating blade stirs the liquid or the solid non-load bearing liquid purification components.

12. The vessel of claim 1 wherein the stearate organo-metallic with copper, zinc or silver metal element is a blend of a copper stearate, silver stearate, or zinc stearate.

13. The vessel of claim 1 further comprising:
a sensor associated with the non-porous housing wherein the sensor measures a characteristic of the liquid located within the interior of the non-porous housing.

14. The vessel of claim 13 further comprising:
a computer connected to the sensor wherein the computer receives and records information obtained from the sensor.

15. The vessel of claim 1 wherein the total surface area of the solid non-load bearing liquid purification components located within the interior non-porous housing of the vessel is greater than 10% of the total surface area of the solid load bearing internal surface of the vessel.

16. The vessel of claim 1 wherein the non-organo-metallic component is a host matrix polymer thermoset comprising at least one of: epoxies, phenolics, cyanate esters, bismaleimides, polyimides, acrylics, powder coats, fiber reinforced polymer (e.g. fiberglass, etc), silicones, urethanes or latexes or which is a paper, cement, concrete and/or ceramic material.

17. The vessel of claim 1 wherein matrix of the stearate organo-metallic with copper, zinc or silver metal element and the element which is the organic-non-metallic element of the solid non-load bearing liquid purification component is constructed from a substantially similar material mixture as the solid load-bearing interior surfaces of the non-porous housing.

* * * * *